US009117027B2

(12) United States Patent
Dayal et al.

(10) Patent No.: US 9,117,027 B2
(45) Date of Patent: Aug. 25, 2015

(54) METHOD AND SYSTEM FOR COMPLIANCE TESTING IN A CLOUD STORAGE ENVIRONMENT

(71) Applicant: Tata Consultancy Services Limited, Maharashtra (IN)

(72) Inventors: Reena Dayal, Lucknow (IN); Nishi Gupta, Lucknow (IN); Hansi Agarwal, Lucknow (IN)

(73) Assignee: Tata Consultancy Services Limited, Mumbai, Maharashtra (IN)

(*) Notice: Subject to any disclaimer, the term of this patent is extended or adjusted under 35 U.S.C. 154(b) by 196 days.

(21) Appl. No.: 14/013,165

(22) Filed: Aug. 29, 2013

(65) Prior Publication Data

US 2014/0068340 A1 Mar. 6, 2014

(30) Foreign Application Priority Data

Sep. 3, 2012 (IN) .......................... 2554/MUM/2012

(51) Int. Cl.
G06F 11/00 (2006.01)
G06F 11/36 (2006.01)
(52) U.S. Cl.
CPC ................................. *G06F 11/3672* (2013.01)
(58) Field of Classification Search
USPC .................................................. 714/32, 38.1
See application file for complete search history.

(56) References Cited

U.S. PATENT DOCUMENTS

| 7,680,927 | B2* | 3/2010 | McMullen et al. ........... 709/224 |
| 2009/0300423 | A1* | 12/2009 | Ferris .............................. 714/38 |
| 2010/0198960 | A1* | 8/2010 | Kirschnick et al. ........... 709/224 |
| 2010/0319004 | A1* | 12/2010 | Hudson et al. ................. 719/313 |
| 2011/0010691 | A1* | 1/2011 | Lu et al. ......................... 717/124 |
| 2011/0131315 | A1* | 6/2011 | Ferris et al. .................... 709/224 |
| 2011/0289440 | A1* | 11/2011 | Carter et al. ................... 715/771 |
| 2012/0072985 | A1* | 3/2012 | Davne et al. ..................... 726/22 |
| 2012/0221522 | A1* | 8/2012 | Allman et al. ................. 707/624 |
| 2012/0296977 | A1* | 11/2012 | Ellison et al. .................. 709/204 |
| 2012/0303776 | A1* | 11/2012 | Ferris ............................. 709/223 |
| 2012/0324069 | A1* | 12/2012 | Nori et al. ...................... 709/222 |
| 2013/0097306 | A1* | 4/2013 | Dhunay .......................... 709/224 |
| 2013/0111027 | A1* | 5/2013 | Milojicic et al. ............... 709/225 |
| 2013/0174168 | A1* | 7/2013 | Abuelsaad et al. ............ 718/102 |
| 2013/0191726 | A1* | 7/2013 | Park et al. ...................... 715/235 |
| 2013/0204849 | A1* | 8/2013 | Chacko .......................... 707/692 |
| 2013/0268913 | A1* | 10/2013 | Anderson et al. ............. 717/120 |
| 2014/0164315 | A1* | 6/2014 | Golshan ......................... 707/608 |
| 2014/0282456 | A1* | 9/2014 | Drost et al. .................... 717/158 |
| 2014/0282518 | A1* | 9/2014 | Banerjee ........................... 718/1 |
| 2014/0351796 | A1* | 11/2014 | Gur-esh et al. ................ 717/126 |
| 2014/0359128 | A1* | 12/2014 | Bhattacharya et al. ........ 709/226 |
| 2015/0067761 | A1* | 3/2015 | Bade et al. ......................... 726/1 |

OTHER PUBLICATIONS

SNIA, "Cloud Data Management Interface (CDMI™) Version 1.0.2", SNIA Technical Position, Jun. 4, 2012.

(Continued)

*Primary Examiner* — Kamini Patel
(74) *Attorney, Agent, or Firm* — Hayes Soloway, PC

(57) ABSTRACT

The invention provides automated test suite for compliance testing of cloud storage server to a Cloud Data Management Interface (CDMI) by performing functional testing of CRUD (Create, Read, Update, and Delete) operations. It offers a solution containing test scripts for validating the response from CRUD operations performed on CDMI objects and checks for the cloud storage to be CDMI compliant.

12 Claims, 3 Drawing Sheets

CATS Architecture

(56) References Cited

OTHER PUBLICATIONS

Tata Consultancy Services Limited, "Cloud Data Management Interface' Automated Test Suite (CATS)", 2012, High Tech Brochure, India.

Tata Consultancy Services "TCS Develops CDMI Automated Test Suite to Support Cloud Storage Interoperability", Nov. 7, 2011, Mumbai, India.

David Slik, NetApp, Inc, "CDMI conformance and performance testing", 2011.

INFOSYS, "Cloud Migration Testing Approach", Jun. 6, 2012.

Nelson Hall, "IT Outsourcing Vendor Profile of: Infosys—Software Testing", Mar. 2012.

Swati Ranganathan, "Phases of Data migration: Test".

HEXAWARE Technologies "Data Migration".

* cited by examiner

Fig 1: CATS Architecture

METHOD AND SYSTEM FOR COMPLIANCE TESTING IN A CLOUD STORAGE ENVIRONMENT

FIELD OF INVENTION

The invention relates to the field of software testing, and more particularly to compliance testing within a cloud computing network.

BACKGROUND

Cloud storage nowadays has become one of the convenient ways of data storage and data sharing. There are various vendors that offer cloud storage services like web hosting besides providing scalable infrastructure for better performance. Amazon's cloud services include Simple Storage Service (Amazon S3), the Amazon cloud drive. Similarly Microsoft has its own cloud storage services like Sky Drive, Windows Azure and similar such services.

However there are a few major challenges faced by end customers in existing cloud storage services. One of the major challenges is that there is no way for a cloud storage service provider to directly migrate customer data to another cloud storage service provider. If a service goes down, the hosting company must return the data to its customer, who then must find another provider or revert back to storing it locally. This is because the API's are specific for each vendor. Moreover there are no rules and regulations for data deletion. Further the financial aspects related to each of the cloud storage offered to end-customers are different for each vendor.

In the state of art there have been attempts to check performance and conformance testing while deploying solutions on the cloud storage. One of the prior art discloses about the SNIA standards and illustrates on how "capabilities" gets implemented. However there have been rare attempts for compliance testing as proposed in the invention.

For resolving these challenges, Storage Network Industry Association (SNIA) has come up with cloud standard APIs known as Cloud Data Management Interface (CDMI) which helps client in moving data from one cloud vendor to another cloud vendor without the pain of recoding to different interfaces. With this standard way of billing and using CDMI, a customer can compare capabilities of different Cloud storage's vendors. SNIA has a technical working group (TWG) for developing these standards.

CDMI needs to be implemented by the cloud vendors as a separate module for enabling the invention as described in the detailed description. However there is no such existing technology that assists a CDMI enabled cloud vendor to perform compliance testing of CDMI module implemented by the storage server. Thus a need for developing an automated test suite for CDMI specification exists.

Enterprises using API-based vendor proprietary cloud storage solutions face a challenge of vendor lock-in owing to diverse and vendor-specific solutions. It is therefore imperative to adopt industry-standard-interface CDMI-based solutions, which facilitate interoperability between cloud storage solutions through vendor neutrality. Since, CDMI-based specifications offer multiple Cloud storage use cases such as Cloud-to-Cloud migration, and also provide a functional application interface to create, retrieve, update, and delete data elements from the Cloud, it is worthwhile to introduce a solution that for which the CDMI specification forms a base and depending upon it compliance testing of data within a cloud computing environment is performed.

In the light of the above mentioned challenges a need is exists for a comprehensive solution that perform the compliance testing of CDMI module implemented by the Storage Server.

OBJECTIVES OR THE INVENTION

The principle objective of the invention is to provide a solution for compliance testing of CDMI (Cloud Data Management Interface) module as implemented by the storage server.

One other objective of the invention is to test the degree to which the Cloud Storage Server is CDMI compliant.

Yet another objective of the present invention is to provide automated test suite for CDMI specification.

Another objective of the invention is to verify the functionality check in case of any discrepancy observed.

SUMMARY OF THE INVENTION

The invention helps to perform automated compliance testing in a cloud computing environment by way of providing automated test suites for CDMI specification. The invention works in accordance with the CDMI standards established as per SNIA.

In one aspect, the present invention provides a method of compliance testing system in a cloud storage environment wherein the method steps comprised of following steps:

retrieving a definition information asserting competency of plurality of cloud providers by performing a capability check and setting a http request message to a server using authentication parameters; identifying plurality of requisite test cases within a test script, including optionally created data objects from the data files, conforming to said competency for execution; executing the http request on the identified test script; verifying http status code and response parameters upon receiving an output response from the server; and validating if a requested functionality is executable on the server.

In another aspect a system of compliance testing system in a cloud storage environment is provided, the system comprising: a capability detecting module configured for retrieving a definition information asserting competency of plurality of cloud providers by performing a capability check and setting a http request message to a server using authentication parameters; an execution module for identifying plurality of requisite test cases within a test script, and executing an http request thereon; and a verification module configured to verify http status code and response parameters upon receiving an output response from the server; and validating if a requested functionality is executable on the server.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. These and other features of the present invention will become more fully apparent from the following description, or may be learned by the practice of the invention as set forth hereinafter.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific system and method disclosed in the drawings.

DETAILED DESCRIPTION

Figure 1:
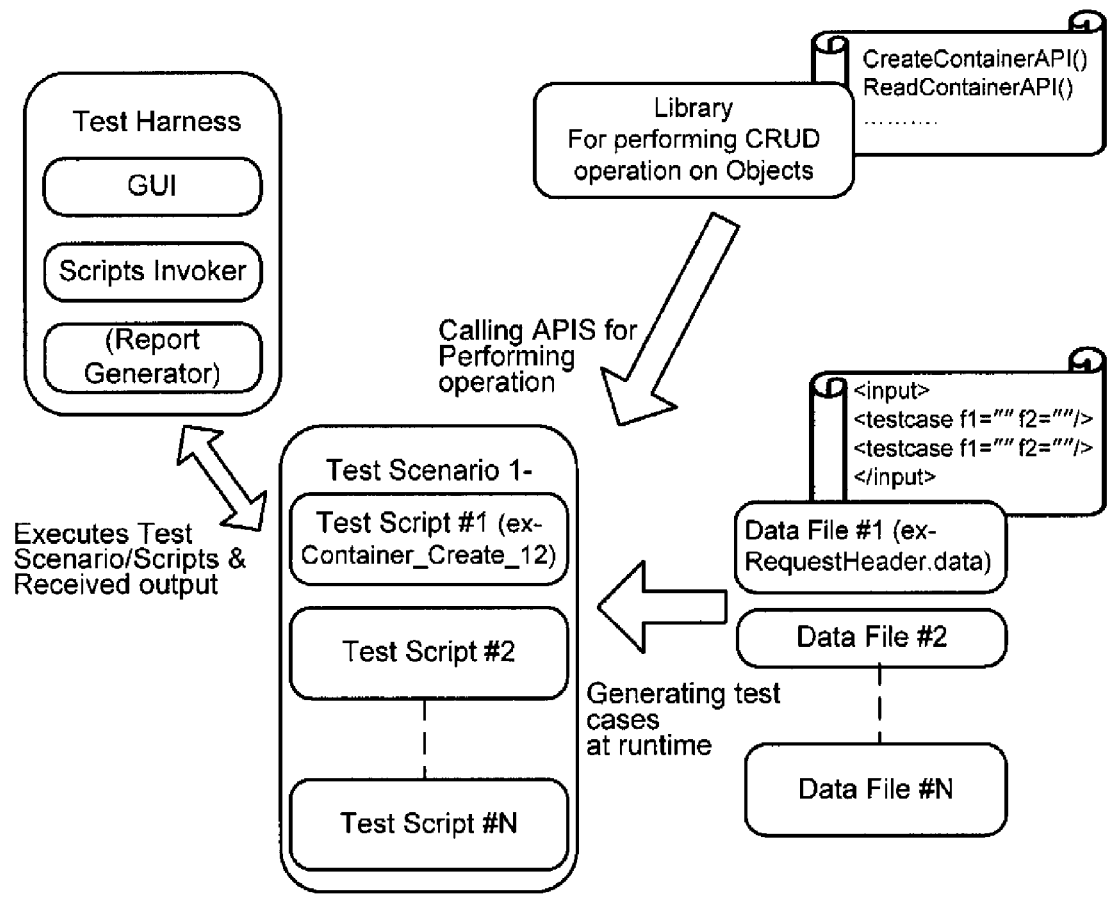
FIG. 1 illustrates the major components of the system and the overall architecture in accordance with an embodiment of the present invention.

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise.

Although any systems and methods similar or equivalent to those described herein can be used in the practice or testing of embodiments of the present invention, the preferred, systems and methods are now described.

The invention provides a system and method of compliance testing for CDMI/Non CDMI objects and tests the degree to which cloud storage server is CDMI compliant by performing protocol and functional testing of CRUD (Create, Read, Update, and Delete) operation on five CDMI/Non CDMI objects namely:
1. Capability Object
2. Container Object
3. Data Object
4. Queue Object
5. Domain Object There are following scenarios which are tested based on supported capabilities—
Create container
Read Container
Update Container
Delete Container
Create data object using POST
Create queue object using POST
Create data object
Read Data Object
Update data object
Delete Data Object
Read Capability Object
Create Queue Object
Read Queue Object
Update Queue Object
Delete Queue Object
Create Domain Object
Read Domain Object
Update Domain Object
Delete Domain Object For each of the above mentioned scenario multiple test cases are designed. Following are some scenarios that illustrate the creation of test cases for the above scenarios.
Scenario—Create Container

Example #1

To Create Successful Container

If server supports cdmi_create_container capability
Steps—
1. Set valid login credentials
2. Execute PUT request for container by specifying container name as "TestContainer1" using URI
   Get <root URI>/TestContainer1/.
3. Check for correct Http status code returned.
4. Verify that all mandatory fields for the "Testcontainer1" are returned in the response body.
5. Verify if container has been created successfully by executing GET request for "TestContainer1" Using URI—
   GET<root URI>/TestContainer1/
6. Cleanup

Example #2

To Create Container with Invalid Login Credential

If server supports cdmi_create_container capability
Steps—
1. Set invalid login credentials
2. Execute PUT request for container by specifying container name as "TestContainer1" using URI
   Get <root URI>/TestContainer1/.
3. Check for correct Http status code returned.
4. Cleanup
   If server supports cdmi_create_container capability

Example #3

To Create Successful Container

Steps—
1. Set valid login credentials
2. Execute PUT request for container by specifying container name as "TestContainer1" using URI
   Get <root URI>/TestContainer1/.
3. Check for correct Http status code returned.
4. Verify that all mandatory fields for the "Testcontainer1" are returned in the response body.
5. Verify if container has been created successfully by executing GET request for "TestContainer1" Using URI—
   GET<root URI>/TestContainer1/Cleanup

Example #4

To Copy an Existing Container to a New Container

If server supports cdmi_create_container and cdmi_copy_container capability
Steps—
1. Set valid login credentials
2. Execute PUT request for container by specifying container name as "TestContainer1" using URI
   Put <root URI>/TestContainer1/
3. Set request message body by specifying 'copy' field with the URI of existing container i.e. "TestContainer1" to be copied for below request 4. Execute PUT request for container by specifying container name as "TestContainer2" using URI
Put <root URI>/TestContainer2/
5. Check for correct Http status code returned
6. Verify that all mandatory fields for the "Testcontainer2" are returned in the response body
7. Verify if container has been created successfully by executing GET request for "TestContainer2" Using URI—
GET<root URI>/TestContainer2/
8. cleanup
Scenario—Create Data Object Example #1

To create a data object when more than one field (optional) are specified together.
If server supports cdmi_create_data object
Steps—
1. Set valid login credentials
2. Execute PUT request for container by specifying container name as "TestContainer1" using URI
Put <root URI>/TestContainer1/
3. Set more than one fields in request message body for the PUT request for creating data object. Set the fields using Data files
4. Execute the PUT request for data object by specifying data object name ("do1") and its parent directory as container name using URI—
<PUT <root URI>/TestContainer1/do1
5. Check for correct Http status code returned
6. cleanup
Scenario—Update Queue Object Example #1

To Update Queue Object with valid fields in request message body.
If server supports cdmi_queues capability
Steps—
1. Set valid login credentials
2. Execute PUT request for container by specifying container name as "TestContainer1" using URI
Put <root URI>/TestContainer1/
3. Execute PUT request for Queue object by specifying queue name as "qo1" using URI
Put <root URI>/TestContainer1/qo1
4. Set valid fields in request message body for the below PUT request using data file
5. Execute the PUT request to update queue object using URI—
PUT <root URI>/TestContainer1/qo1
6. Check for correct Http status code returned.
7. cleanup
Scenario—Delete Domain Object Example #1

To delete a domain object with unauthenticated credentials.
If server supports cdmi_domains and cdmi_delete_domain capabilities
Steps—
1. Execute PUT request for domain object by specifying domain name as "TestDomain1" with parent directory as "cdmi_domains" using URI
Put <root URI>/cdmi_domains/TestDomain1/
2. Set unauthenticated credentials in DELETE request.
3. Execute DELETE request for domain object using URI:
DELETE <root URI>/cdmi_domains/TestDomain1/
4. Check for correct Http status code returned 5. Cleanup The invention tests operations for both TLS (Transport Layer Security) and Non-TLS server on CDMI/Non CDMI objects. The process of compliance testing for CDMI and Non CDMI objects involves certain fixed steps. Initially a capability check is performed. If capability is supported by cloud storage provider then proceeds to next step. Next step involves authentication of the request (request can be CRUD), which when found authenticated transmits the Http request. After receiving the request, the server sends a response, wherein the response comprises of various response parameters that later gets subjected to a verification process. The response from the server broadly comprises of:

1. Http status code
2. Response Header
(e.g. Content-type, X-cdmi-specification version etc)
3. Response Message body—
Attributes of the cdmi object e.g. ObjectName, ObjectID, parentName, parentURI etc.

This response goes through a verification check to determine whether there is discrepancy in response or if any mandatory parameter's value is null or incorrect. If the response is OK, there is a check that whether the requested functionality is actually executed on the server or not. Lastly to terminate the operation cleanup is done.

Now referring to FIG. 1, the major components involved in the system and the overall architecture of the system is presented. The test harness is used to provide automated test suites for compliance testing of CDMI module implemented by the storage server. The test harness further comprises of a GUI that is used to invoke the test scripts and after execution of scripts reports are provided in portable document format (PDF). For each test scenario, multiple test scripts are present, and these test scripts receives data from the data files. Thus there are multiple test cases generated for a test script. The library module of the present invention has APIs for performing create, read, update, and delete operations on CDMI/Non CDMI objects. There are other functions also like—function for response validation and so on. The data files are used as input to the test scripts.

The invention involves two types of test cases in the test suite viz. Parameterized/Non Parameterized. Primarily the basic difference in executing the Parameterized and Non Parameterized test cases is that while the former requires use of data files, latter does not; rest all other steps of execution remaining the same. In one embodiments of the invention parameterized test cases are generated in the test suite. Before starting execution of test cases, initially all the capabilities supported by cloud vendor is fetched for whom testing for CDMI compliance needs to be performed.

The following steps are followed within each test case:
1. Capability check: If capability(s) corresponding to the test scenario, is supported by cloud storage provider then move to next step else the test case is not executed. This is implemented by using advanced use of JUnit so that only cloud vendor's capability based test cases are executed.
2. Create the prerequisite objects if required in a test scenario. For Instance—for scenario "Successful creation of data object" creation of container is prerequisite.
3. Set valid login credentials.
4. Steps 1 to 6 are executed until all fields of data file are read for having multiple set of input parameters. Hence multiple test cases are built for one scenario.

1. Fetch values from the data file and set in an input request.
2. Set Request Header.
3. Execute Http request.
4. Check for correct Http status code returned.
5. The response goes through a verification check whether there is discrepancy in response or if any mandatory parameter's value is incorrect or null.
6. If the response is OK, there is a check that whether the requested functionality is actually executed on the server or not.
7. Finally cleanup is executed.

In another embodiment of the invention non parameterized test cases are generated.

The following steps are followed within each Non Parameterized test case:
1. Capability check: If capability(s) corresponding to the test scenario is supported by cloud storage provider then move to next step else that test case is not executed. For this has been implemented using JUnit so that only cloud vendor's capability based test cases are executed.
2. Create the prerequisite objects if required in a test scenario. For Instance—for scenario "Successful creation of data object" creation of container is prerequisite.
3. Set valid login credentials.
4. Set required parameters in input request header/message body.
5. Execute Http request.
6. Check for correct Http status code returned.
7. The response goes through a verification check whether there is discrepancy in response or if any mandatory parameter's value is incorrect or null.
8. If the response is OK, there is a check that whether the requested functionality is actually executed on the server or not.
9. Finally cleanup is executed.

Figure 2:
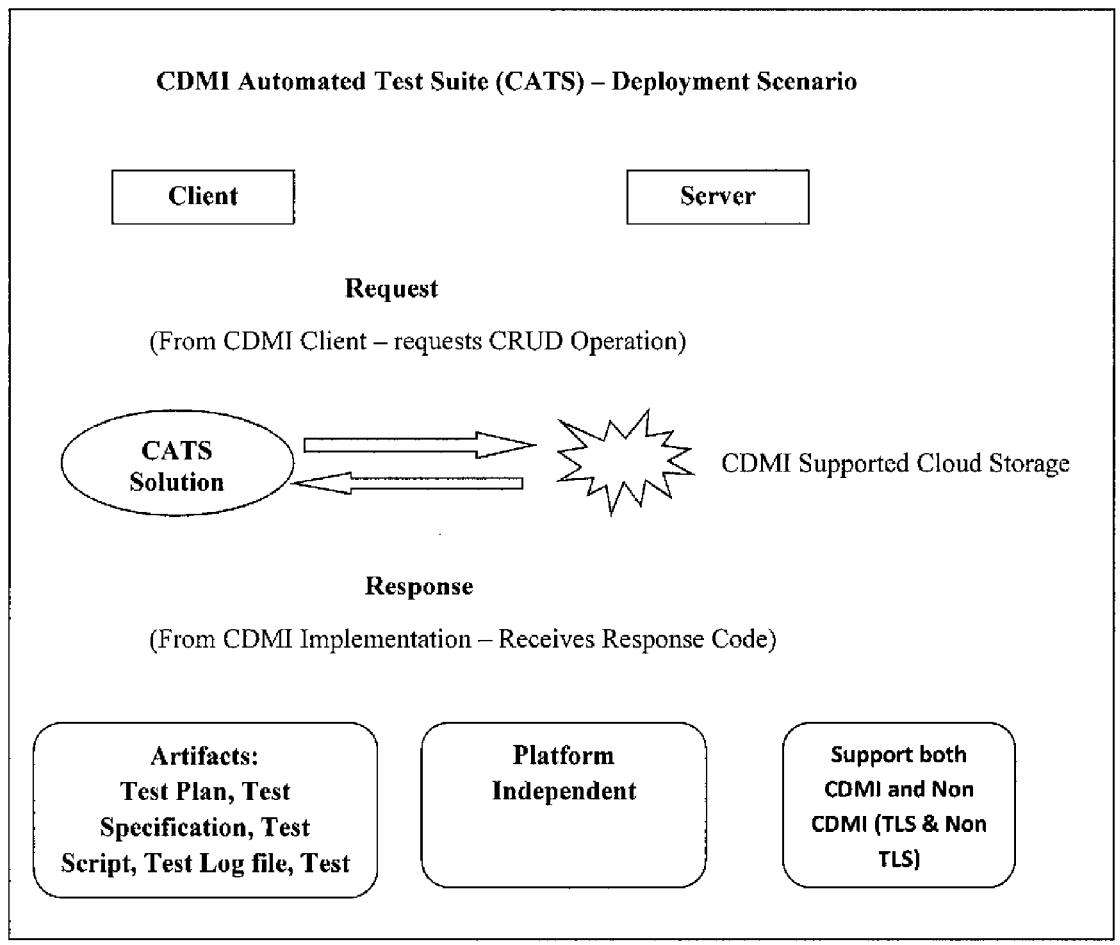
FIG. 2 illustrates about a deployment scenario of the present invention and the components associated thereof in an embodiment of the present invention.

Referring to FIG. 2, the deployment scenario of the invention is illustrated. The invention is used to verify the degree to which a cloud storage system is CDMI compliant. It is the package containing test scripts for validating the response from CRUD operations performed on CDMI objects and checks for the cloud storage to be CDMI compliant. The check for the CDMI compliance works as follows.

Initially an input request is sent. The CDMI client sends http GET/PUT/POST/DELETE input request for the CDMI Object to CDMI server. In response to the input request the Server returns http response which has response header, http status code and http response body with mandatory parameters and optional parameters of the CDMI object, called as the output response. In the next step verification of the status code and the response body is performed where determination of successful execution of sent request made.

Figure 3:
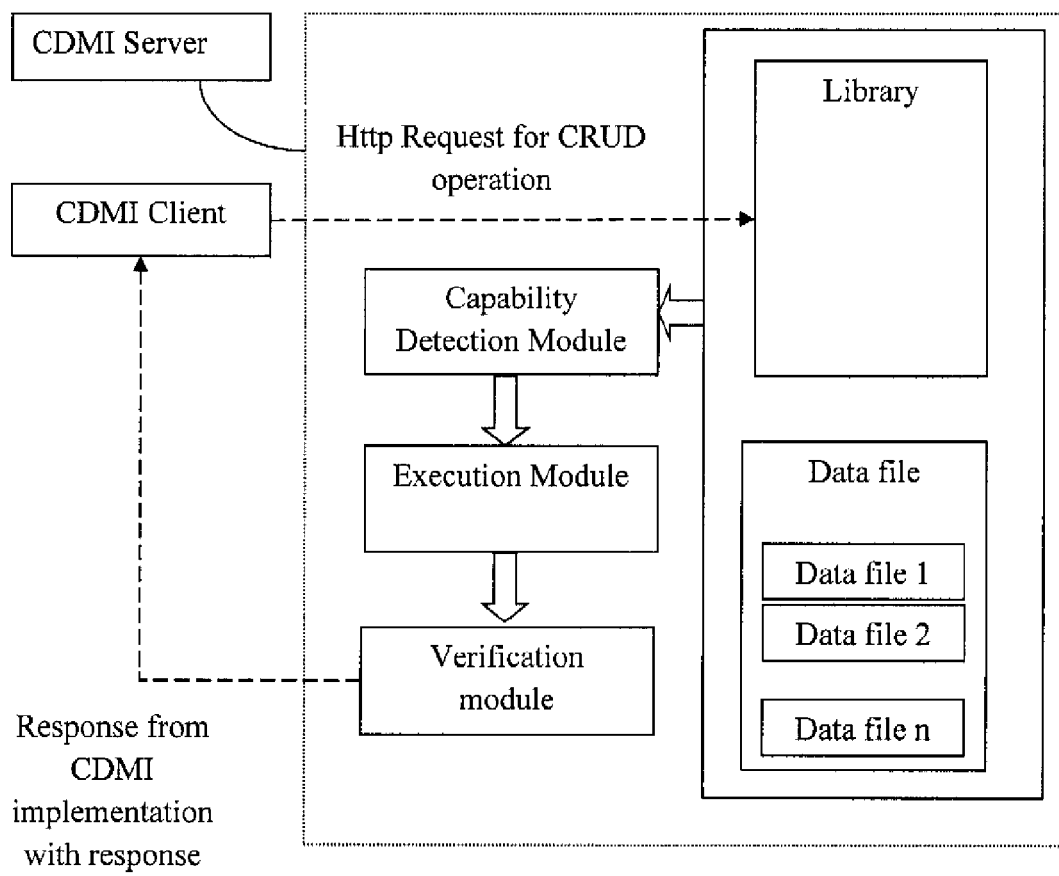
FIG. 3 represents the overall system of the invention and the components involved in the same.

Referring to the system as shown in FIG. 3, it broadly comprises of a capability detection module for assessing if the capability for performing functionality is supported by the cloud service provider. Next an authentication step is performed that involves setting authentication parameter for the http request (request can be CRUD), after which the request header and request body are set in the http request and transmitted to the server by the execution module. Once the execution module executes the http request and transmits to the server, it receives the server response for further transmitting to the verification module. The response comprises of various response parameters that later gets subjected to a verification process in the verification module. The response from the server broadly comprises of:

1. Http status code
2, Response Header
(e.g. Content-type, X-cdmi-specification version etc)
3. Response Message body—
Attributes of the cdmi object e.g. ObjectName, ObjectID, parentName, parentURI etc.

This response goes through a verification check in the verification module to determine whether there is discrepancy in response or if any mandatory parameter's value is null or incorrect. If the response is OK, there is a check that whether the requested functionality is actually executed on the server or not. The verification module communicates with the library which has APIs for performing create, read, update, and delete operations on CDMI objects. There are other functions also like—function for response validation and so on. Lastly to terminate the operation cleanup is done.

Advantages of the Present Invention:
1. The automated test suite provides Compliance testing for conformity to SNIA CDMI Specification for different Cloud Storage use cases.
2. The same steps can be used for testing proprietary APIs of any cloud storage providers.
3. The data files concept helps in executing multiple test cases using only one script. Hence helps in executing multiple scenarios and giving higher coverage of testing.
4. However, only those test cases will be executed for which capability is supported by CDMI Cloud Storage providers.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "executing" or "verifying" or "validating" or the like, refer to the action and processes of a computer system, or similar electronic computing device having a processor and a non-transitory memory, among other components, that manipulates and transforms data represented as physical (electronic) quantities within the computer system's registers and memories into other data similarly represented as physical quantities within the computer system memories or registers or other such information storage or transmission.

Working Example

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The process presented herein in the working example is not inherently related to any particular computer or other apparatus, but for enabling the working of invention by a person skilled in the art. Various general-purpose systems may be used with programs in accordance with the teachings herein, or it may prove convenient to construct a more specialized apparatus to perform the operations described.

Scenario: Create Container Example To create container successfully with different valid names.
1. Check If server supports "cdmi_create_container" capability. If it is supported then follow steps from 2 onwards, else test case is not executed.
2. Set valid login credentials
3. Fetch valid container names from data file.
4. Execute PUT request for container by specifying container name fetched from data file, using URI
   Put <root URI>/<container name>/.
5. Check for correct Http status code returned.
6. Verify that all mandatory fields for the container are returned in the response body and are not null and have correct values.
7. Execute GET request for container to check if it is created successfully, using URI
   Get <root URI>/<container name>/.
8. Check for correct Http status code returned.
9. Cleanup for container created.

Steps 3 to 9 are executed until all fields from data file are fetched.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A method of compliance testing system in a cloud storage environment, the method comprising:
   Retrieving, by a processor, a definition information asserting competency of a plurality of cloud providers by performing a capability check and setting a http request message to a server using authentication parameters, wherein the http request message refers to GET/PUT/POST/DELETE requests, wherein the GET/PUT/POST/DELETE requests are sent for CDMI objects on the server for performing a functionality and setting a request header for an operation, and wherein the authentication parameters include login credentials;
   identifying, by the processor, a plurality of requisite test cases within a test script, including optionally created data objects from the data files, conforming to said competency for execution;
   executing, by the processor, the http request message on the identified test script;
   verifying, by the processor, a http status code and response parameters upon receiving an output response from the server; and
   validating, by the processor, if a requested functionality is executable on the server.

2. The method of claim 1, wherein the capability check asserts if at least one of the plurality of cloud storage providers has a capability conforming to at least one of the plurality of requisite test cases.

3. The method of claim 1, wherein at least one verification of response parameters involves verifying whether there is discrepancy in the server response or if any mandatory parameter's value is incorrect or null.

4. The method of claim 1, wherein the output response returns a http response which has a response header, the http status code and a http response body.

5. The method of claim 4, wherein the response header contains mandatory response parameters comprising content type and X-CDMI-specification version.

6. The method of claim 4, wherein the response body contains response parameters comprising at least one attribute of CDMI objects, wherein the at least one attribute of CDMI objects further comprises at least one of object name, object ID, parent name, and parent URL.

7. The method of claim 1, wherein the requested functionality is one of a read operation, a creates operation, an update operation, and a delete operation.

8. A system of compliance testing system in a cloud storage environment, the system comprising:
   a processor; and
   a non-transitory memory coupled to the processor, wherein the processor executes modules stored in the non-transitory memory, wherein the modules comprises:
      a capability detecting module configured for retrieving definition information asserting competency of a plurality of cloud providers by performing a capability check and setting a http request message to a server using authentication parameters, wherein the http request message refers to GET/PUT/POST/DELETE requests, wherein the GET/PUT/POST/DELETE requests are sent for CDMI objects on the server for performing a functionality and setting a request header for an operation, and wherein the authentication parameters include login credentials;
      an execution module for identifying a plurality of requisite test cases within a test script, and executing an http request thereon; and
      a verification module configured to verify http status code and response parameters upon receiving an output response from the server, and validating if a requested functionality is executable on the server.

9. The system of claim 8, wherein the capability detecting module asserts if at least one of the plurality of cloud storage providers has capability conforming to at least one of the plurality of requisite test cases.

10. The system of claim 8, wherein the verification module verifies whether there is discrepancy in a server response or if any mandatory parameter's value is incorrect or null.

11. The system of claim 8, wherein the output response returns http response which has a response header, the http status code and a http response body with mandatory parameters and optional parameters of the CDMI object.

12. The system of claim 8, wherein the functionality is at least one of a read operation, a creates operation, an update operation and a delete operation.

* * * * *